(12) United States Patent
Harada et al.

(10) Patent No.: US 7,617,506 B2
(45) Date of Patent: Nov. 10, 2009

(54) OPTICAL DISC APPARATUS

(75) Inventors: Nozomu Harada, Kawasaki (JP); Hideyuki Onuma, Kuala Lumpur (JP); Yoshiaki Yamauchi, Higashiibaraki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 518 days.

(21) Appl. No.: 11/443,850

(22) Filed: May 24, 2006

(65) Prior Publication Data
US 2007/0006240 A1  Jan. 4, 2007

(30) Foreign Application Priority Data
Jul. 4, 2005 (JP) .............. 2005-194982

(51) Int. Cl.
*G11B 17/04* (2006.01)
(52) U.S. Cl. .............. 720/610; 720/637; 720/639; 720/657
(58) Field of Classification Search ........... 720/610, 720/636–637, 639, 657; 360/75.2
See application file for complete search history.

(56) References Cited

U.S. PATENT DOCUMENTS

| 7,043,740 | B2 * | 5/2006 | Chen et al. ............ 720/610 |
| 2003/0117929 | A1 * | 6/2003 | Bae et al. ............. 369/75.2 |
| 2004/0205787 | A1 * | 10/2004 | Wu ................... 720/610 |
| 2005/0010937 | A1 * | 1/2005 | Chen et al. ............ 720/610 |
| 2005/0066342 | A1 * | 3/2005 | Tu ................... 720/610 |
| 2005/0071858 | A1 * | 3/2005 | Chen et al. ............ 720/610 |
| 2006/0265722 | A1 * | 11/2006 | Yang et al. ............ 720/610 |

FOREIGN PATENT DOCUMENTS

| JP | 10-083651 | 3/1998 |
| JP | 11-353752 A | 12/1999 |
| JP | 2000-076766 | 3/2000 |
| JP | 2004-227702 | 8/2004 |
| JP | 2005-339681 | 12/2005 |

OTHER PUBLICATIONS

State Intellectual Property Office of China (SIPO) office action dated Dec. 24, 2007 for SIPO patent application CN2006-100918470.

* cited by examiner

*Primary Examiner*—Andrea L Wellington
*Assistant Examiner*—Carlos E Garcia
(74) *Attorney, Agent, or Firm*—Townsend and Townsend and Crew LLP

(57) ABSTRACT

An optical disc apparatus has the following arrangements. Specifically, the optical disc apparatus includes a lock pin and a lock arm. The lock pin is disposed on a side of an inner surface of a case of the apparatus, being tapered in a protruding direction thereof. The lock arm is disposed on a side of a tray of the apparatus. The lock arm, urged by a resilient member, includes a hook portion to be engaged with an inclined surface of the lock pin. When the tray has moved to a predetermined position within the case, the lock arm is engaged with the lock pin, so that the tray is held in position at the predetermined position. When an impact force equal to, or more than, a predetermined value is applied to the optical disc apparatus, the hook portion of the lock arm is displaced in the protruding direction of the lock pin along the inclined surface of the lock pin, thereby disengaged from the lock pin. Engagement of the tray is thereby released.

6 Claims, 5 Drawing Sheets

OPTICAL DISC APPARATUS

CLAIM OF PRIORITY

The present application claims priority from Japanese application serial No. P2005-194982, filed on Jul. 4, 2005, the content of which is hereby incorporated by reference into this application.

BACKGROUND OF THE INVENTION

1. Technical Field of the Invention

The present invention relates to an optical disc apparatus and, more particularly, to a structure for holding a tray for loading and unloading an optical disc.

2. Description of the Related Art

A known optical disc apparatus incorporates a structure that uses an engagement lock pin having substantially a predetermined thickness for holding a tray in position and has a lock arm, a hook portion of which is pressed substantially at right angles against a surface. Accordingly, if an impact force is applied to the apparatus, a large force is applied from the hook portion to the lock pin, resulting very often in a damaged hook portion or lock pin. In association with the present invention, known art for improving impact resistance of the apparatus includes techniques disclosed in, for example, Japanese Patent Laid-open No. 2000-76766, Japanese Patent Laid-open No. Hei 10-83651, and Japanese Patent Laid-open No. 2004-227702. Japanese Patent Laid-open No. 2000-76766 discloses an arrangement as a tray lock mechanism in a disc drive or the like, in which a sliding portion of a lock lever is formed into an arc having a center at a pivot of the lock lever, thereby preventing a tray in a condition of being fixed to a chassis from being unlocked even when an impact is applied thereto. Japanese Patent Laid-open No. Hei 10-83651 discloses an arrangement as a shutter lock mechanism for a disc cartridge, in which the disc is protected from possible damage by making a shutter member disengageable from an engagement portion of a shutter lock member when an impact is applied. Japanese Patent Laid-open No. 2004-227702 discloses an arrangement, in which, should an impact force be applied in a direction of ejecting a tray from a main body unit, an urging force of a resilient member lessens a force to be applied to a lock arm and a rib, or the lock arm is rotated so as to allow a hook portion to be disengaged from the rib.

In any of the foregoing conventional arrangements, however, disengagement of the lock arm or the lock lever is accomplished, when the impact force is applied to the optical disc apparatus, through displacement of the lock arm or the lock lever in a plane of rotation thereof. This could necessitate installation of an addition part for disengagement operation, or make the structure concerned complicated.

It is therefore an object of the present invention to ensure that, in an optical disc apparatus with a simplified structure incorporating a small number of parts, no parts will be damaged even when an impact is applied thereto.

An advantage of the present invention is to provide an optical disc apparatus offering an outstanding impact resistance.

SUMMARY OF THE INVENTION

The present invention provides an optical disc apparatus that solves the problems of the related art.

In accordance with an aspect of the present invention, the optical disc apparatus has the following arrangements. Specifically, the optical disc apparatus includes a lock pin and a lock arm. The lock pin is disposed on a side of an inner surface of a case of the apparatus, being tapered in a protruding direction thereof. The lock arm is disposed on a side of a tray of the apparatus. The lock arm, urged by a resilient member, includes a hook portion to be engaged with an inclined surface of the lock pin. When the tray has moved to a predetermined position within the case, the lock arm is engaged with the lock pin, so that the tray is held in position at the predetermined position. When an impact force equal to, or more than, a predetermined value is applied to the optical disc apparatus, the hook portion of the lock arm is displaced in the protruding direction of the lock pin along the inclined surface of the lock pin, thereby disengaged from the lock pin. Engagement of the tray is thereby released.

In accordance with the aspect of the present invention, it is possible to provide an optical disc apparatus that offers an outstanding impact resistance by preventing, in the optical disc apparatus, parts of the apparatus from being damaged even when impact is applied thereto.

BRIEF DESCRIPTION OF THE DRAWINGS

The present invention is described hereinafter with reference to the accompanying drawings, in which.

DETAILED DESCRIPTION OF THE PREFERRED EMBODIMENTS

Preferred embodiments according to the present invention will be described below with reference to the accompanying drawings.

Figure 1:
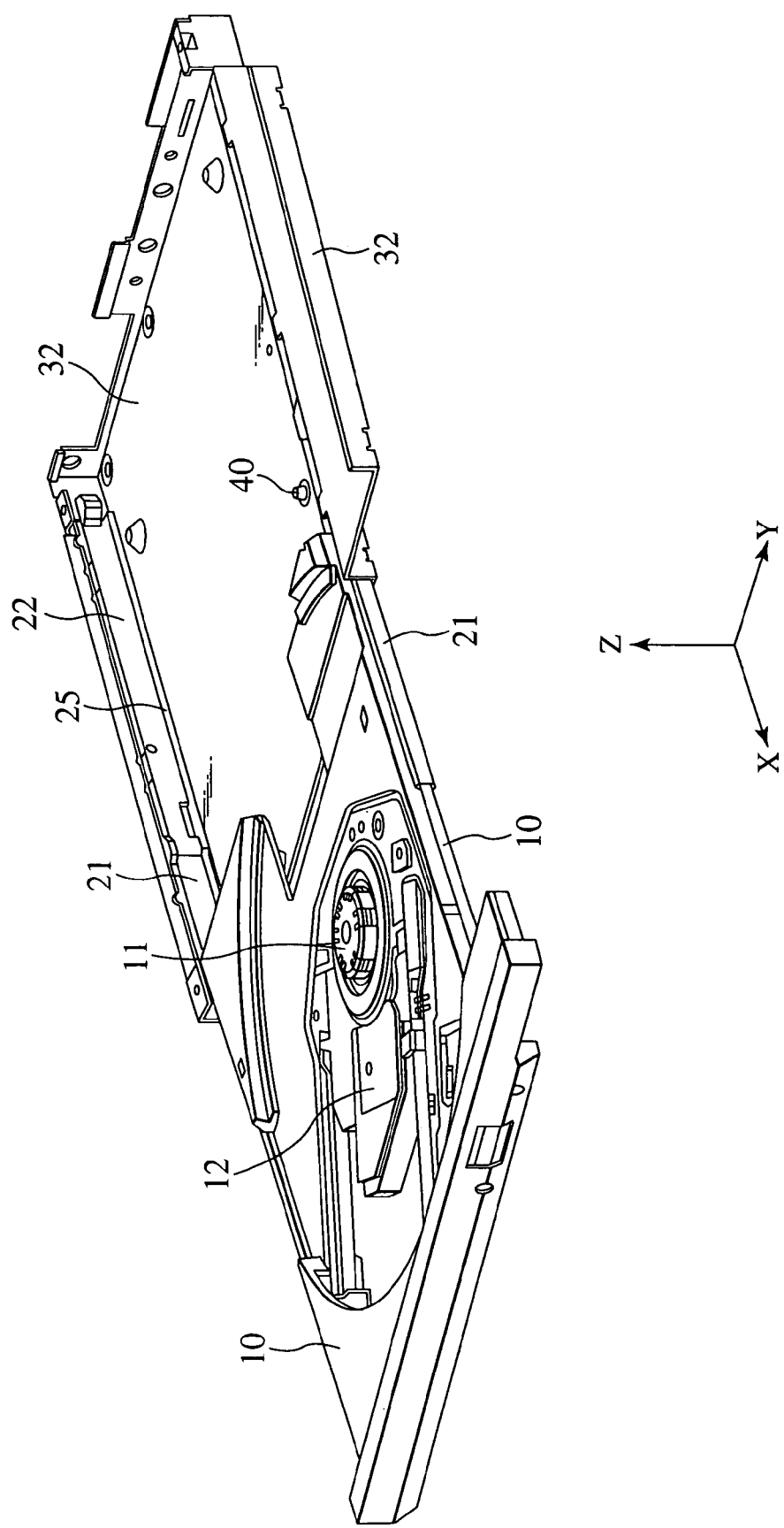
FIG. 1 is a view showing a typical construction of an optical disc apparatus according to a first embodiment of the present invention.
Figure 2:
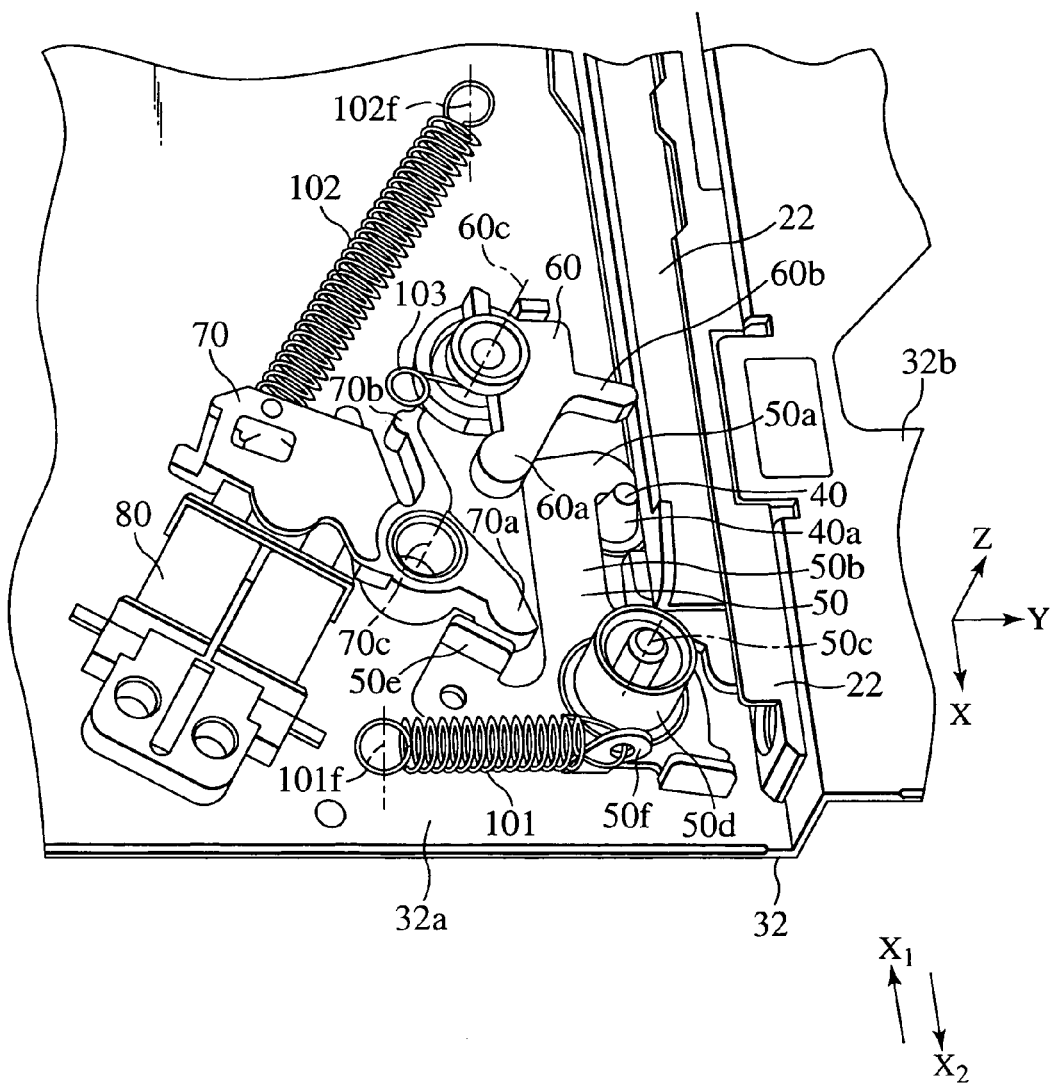
FIG. 2 is a view for illustrating an internal construction of the optical disc apparatus according to the first embodiment of the present invention shown in FIG. 1.
Figure 3A:
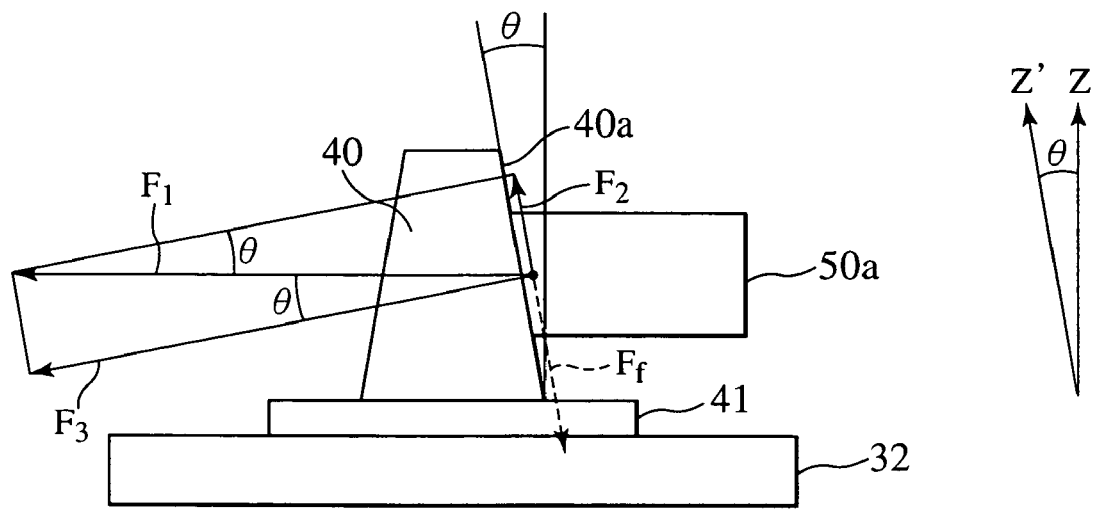
FIGS. 3A and 3B are views for illustrating a force generated at a hook portion of a lock arm in the structure shown in FIG. 2.
Figure 3B:
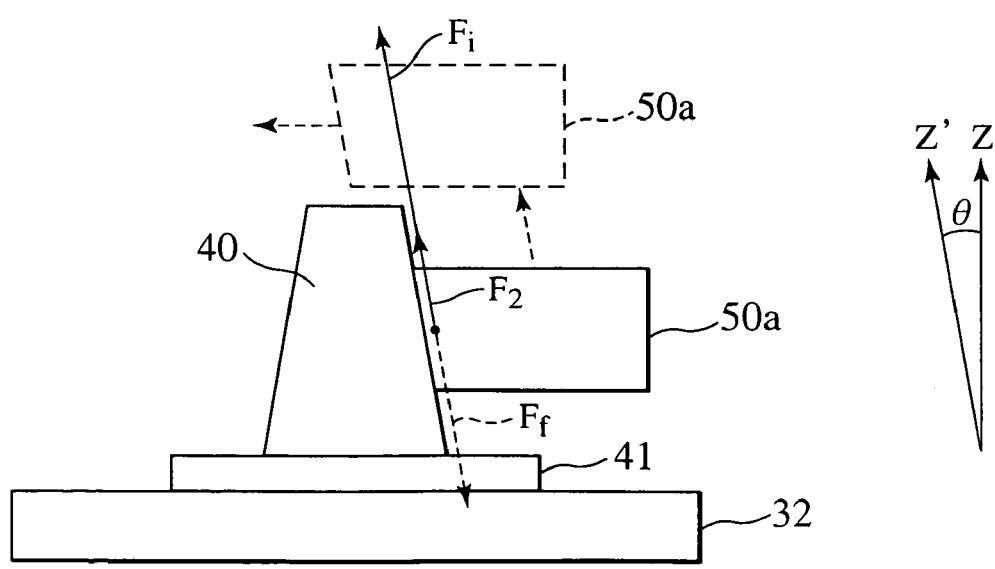
Figure 4A:
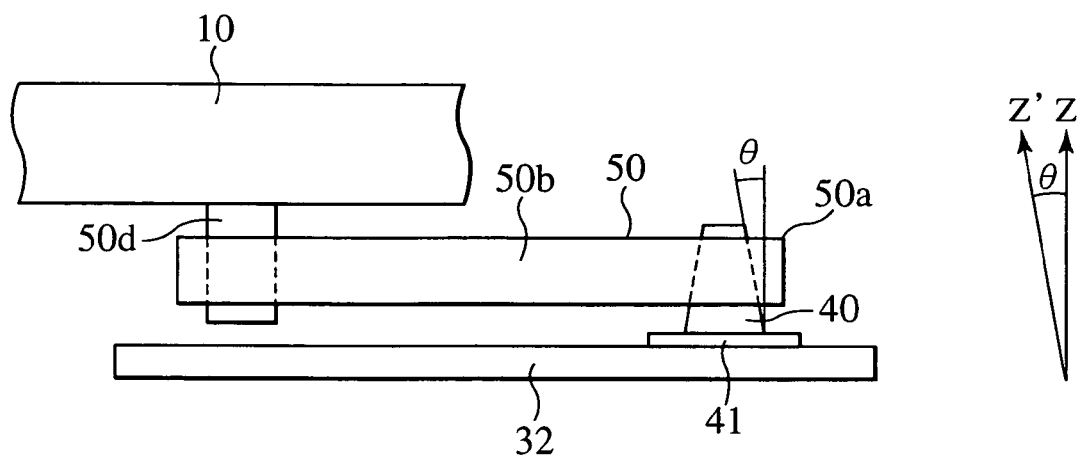
FIGS. 4A and 4B are views for illustrating displacement of the lock arm produced by the force generated at the hook portion.
Figure 4B:
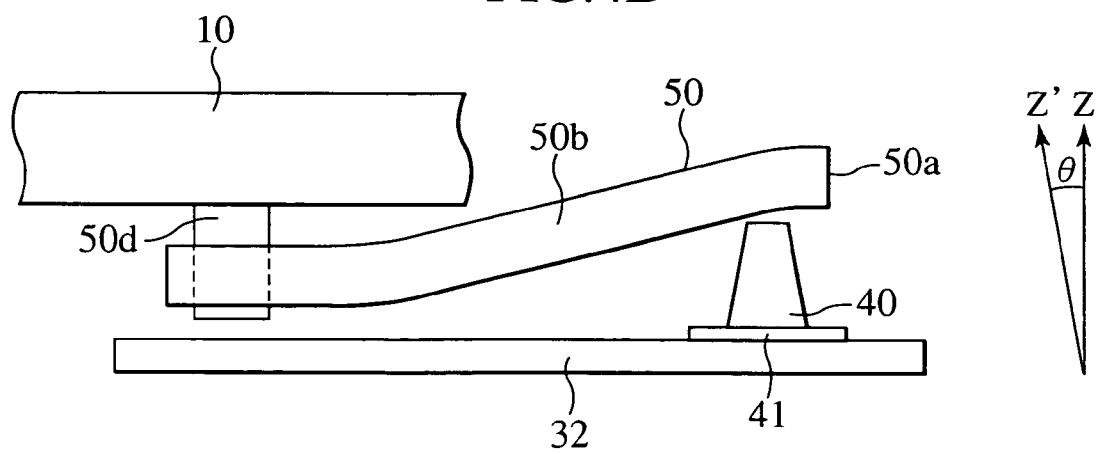

FIGS. 1 through 4A and 4B are views for illustrating a first embodiment of the present invention. FIG. 1 is a view showing a typical construction of an optical disc apparatus according to the first embodiment of the present invention. FIG. 1 shows a condition, in which a tray is unloaded. FIG. 2 is an enlarged view showing an inside of the optical disc apparatus shown in FIG. 1. FIGS. 3A and 3B are views for illustrating a force generated at a hook portion of a lock arm in the structure shown in FIG. 2. FIGS. 4A and 4B are views for illustrating displacement of the lock arm produced by the force generated at the hook portion. In each of FIGS. 1 through 4A and 4B, like numbers reference like elements.

Referring to FIG. 1, reference numeral 10 represents a tray for mounting thereon and moving an optical disc (not shown) to accomplish loading of the optical disc into, and unloading of the same from, a case of a main body of the apparatus. Reference numeral 11 represents a turntable for rotating the optical disc. Reference numeral 12 represents an optical pickup for writing a signal in, and reading a signal from, the optical disc. Reference numeral 21 represents a rail member slidably engaged with an outside of a side end portion of the tray 10 for moving with the tray 10 in a disc loading direction or a disc unloading direction. Reference numeral 22 represents a guide rail member engaged with the rail member 21 on a rail sliding surface 25 for guiding a movement of the rail member 21. Reference numeral 32 represents a bottom case that functions as a case for covering the side of a bottom surface (the side of a bottom surface in FIG. 1) of the apparatus. Reference numeral 40 represents a lock pin disposed in a protruded condition on the side of an inner surface of the bottom case 32. The lock pin 40 is tapered in the direction in which it is protruded. The lock pin 40 holds the tray 10 in a predetermined position in the case when a hook portion of a lock arm (not shown) disposed on the side of the tray 10 abuts on and is then engaged with a surface inclined relative to the protruding direction of the lock pin 40 (hereinafter referred to as "inclined surface"). Specifically, during the process, in which the tray 10 moves into the case and reaches the predetermined position, the lock arm (not shown) disposed on the side of the tray 10 is rotationally displaced about a pivot. When the tray 10 thereafter reaches the predetermined position in the case, the hook portion of the lock arm abuts on and is engaged with the inclined surface at the predetermined position. This allows the tray 10 to be held in the predetermined position in the case. A top case (not shown) that functions as a case covering the side of an upper surface of the apparatus (the side of an upper surface in FIG. 1) is disposed upward of the bottom case 32 in FIG. 1.

FIG. 2 is an enlarged view showing an inside of the optical disc apparatus shown in FIG. 1.

Referring to FIG. 2, reference numeral 32a represents a tray surface opposing portion of the bottom case 32. Reference numeral 32b represents a wing portion of the bottom case 32. Reference numeral 40a represents an inclined surface of the lock pin 40. Reference numeral 50 represents a lock arm to be engaged with the inclined surface 40a of the lock pin 40. Reference numeral 50a represents a hook portion of the lock arm 50 to be engaged with the inclined surface 40a of the lock pin 40. Reference numeral 50b represents an arm portion of the lock arm 50 formed continuously from the hook portion 50a. Reference numeral 50c represents a rotational pivot of the lock arm 50. Reference numeral 50d represents a support portion of the lock arm 50 rotatably supporting the arm portion 50b about the rotational pivot 50c. Reference numeral 50e represents an abutment portion abutting on another rotational member (a second rotational member 70). Reference numeral 50f represents a spring connection portion to which a tension coil spring as a resilient member (a tension coil spring 101) is to be connected. Reference numeral 60 represents a first rotational member. Reference numeral 60a represents a first arm portion of the first rotational member 60. Reference numeral 60b represents a second arm portion of the first rotational member 60. Reference numeral 60c represents a rotational pivot of the first rotational member 60. Reference numeral 70 represents a second rotational member. Reference numeral 70a represents a first arm portion of the second rotational member 70. Reference numeral 70b represents a second arm portion of the second rotational member 70. Reference numeral 70c represents a rotational pivot of the second rotational member 70. Reference numeral 80 represents a solenoid member. Reference numeral 101 represents a tension coil spring as a resilient member connected to the spring connection portion 50f of the lock arm 50. Reference numeral 101f represents a connection portion to the side of the tray 10 (not shown) of the tension coil spring 101. Reference numeral 102 represents a tension coil spring to be connected to the second rotational member 70. Reference numeral 102f represents a connection portion to the side of the tray 10 (not shown) of the tension coil spring 102. Reference numeral 103 represents a torsion coil spring as a resilient member to be connected to the first rotational member 60. The rotational pivot 50c of the lock arm 50, the rotational pivot 60c of the first rotational member 60, the rotational pivot 70c of the second rotational member 70, the connection portion 101f to the side of the tray 10 (not shown) of the tension coil spring 101, the connection portion 102f to the side of the tray 10 (not shown) of the tension coil spring 102, and the solenoid member 80 are all disposed on the tray 10.

FIG. 2 shows a condition, in which the tray 10 is located at the predetermined position in the case of the apparatus main body, at which a write or read operation is enabled relative to the optical disc, and the hook portion 50a of the lock arm 50 is engaged with, and held (locked) in, the inclined surface of the lock pin 40.

The following mechanical operations occur when the tray 10 moves toward the case of the apparatus main body. Specifically, as the tray 10 (not shown) moves in a direction $X_1$ of FIG. 2, the lock pin 40 abuts on, and pushes, the second arm portion 60b of the first rotational member 60, causing the first rotational member 60 to resist a resilient restoring force of the torsion coil spring 103 and thereby rotate in a clockwise direction. The rotation of the first rotational member 60 in the clockwise direction causes the first arm portion 60a of the first rotational member 60 to abut on, and push, the second arm portion 70b of the second rotational member 70. This, in turn, causes the second rotational member 70 to resist a resilient restoring force of the tension coil spring 102 and thereby rotate in a counterclockwise direction. The second rotational member 70 is further rotationally displaced in the counterclockwise direction. When a corresponding portion of the second rotational member 70 then approaches a point within a predetermined distance relative to a magnetic pole of the solenoid member 80, a magnetic attraction of the solenoid member 80 attracts the corresponding portion onto the magnetic pole. As a result, the second rotational member 70 is brought into a latched state. The rotational displacement of the second rotational member 70 in the counterclockwise direction before the second rotational member 70 is brought into the latched state displaces the first arm portion 70a of the second rotational member 70 in a direction of moving away from the abutment portion 50e of the lock arm 50. The arm portion 50b of the lock arm 50 is then rotated in the clockwise direction about the rotational pivot 50c by a resilient restoring force of the tension coil spring 101. When the tray 10 then reaches the predetermined position in the case, the hook portion 50a is engaged with the lock pin 40. As a result, the tray 10 is held (locked) in the predetermined position. The resilient restoring force of the tension coil spring 101 acts on the lock arm 50 in a plane that is substantially perpendicular to the protruding direction of the lock pin 40. A component of a force generated in the hook portion 50a based on the resilient restoring force acting on the lock arm 50, acting in a direction along the inclined surface 40a of the lock pin 40 is adapted to become smaller than a friction force between a surface of the hook portion 50a and the inclined surface 40a.

If an impact force is applied to the apparatus, such as when the apparatus is dropped or in a similar situation, in the condition shown in FIG. 2, the component of the force generated in the hook portion 50a of the lock arm 50, acting in the direction along the inclined surface 40a of the lock pin 40 becomes the sum of the force generated based on the resilient restoring force of the tension coil spring 101 and the force representing the impact force applied. The optical disc apparatus according to the first embodiment of the present invention has the following arrangements. Specifically, if the impact force is less than 200 G, $2\times10^{-3}$ s, a value representing the displacement of the hook portion 50a in the direction along the inclined surface 40a of the lock pin 40 falls within a range, over which the hook portion 50a remains in the inclined surface 40a. If the impact force is equal to, or more than, 200 G, $2\times10^{-3}$ s, the value representing the displacement of the hook portion 50a in the direction along the inclined surface 40a of the lock pin 40 becomes a large one that falls outside the range, over which the hook portion 50a remains in the inclined surface 40a. If the hook portion 50a leaves off the inclined surface 40a, i.e., if the lock arm 50 is disengaged from the lock pin 40, the tray 10 moves in a direction X2 of FIG. 2, being ejected out of the case of the apparatus main body.

FIGS. 3A and 3B are views for illustrating a force generated at the hook portion 50a of the lock arm 50 in the structure shown in FIG. 2. FIG. 3A shows a condition, in which the impact force does not act on the apparatus. FIG. 3B shows a condition, in which the impact force acts on the apparatus.

Referring to FIG. 3A, reference numeral 41 represents a caulking portion relative to the bottom case 32 of the lock pin 40. Symbol θ represents an inclination angle of the inclined surface 40a of the lock pin 40. Reference numeral $F_1$ represents a force generated in the hook portion 50a of the lock arm 50 based on the resilient restoring force of the tension coil spring 101. Reference numeral $F_2$ represents a component of the force $F_1$, acting in the direction along the inclined surface 40a of the lock pin 40 ($F_2 = F_1 \sin\theta$). Reference numeral $F_3$ represents a component of the force $F_1$, acting in the direction substantially perpendicular to the inclined surface 40a of the lock pin 40 ($F_3 = F_1 \cos\theta$). Reference numeral $F_f$ represents the friction force between the surface of the hook portion 50a and the inclined surface 40a. It is arranged that the force $F_2$ is made smaller than the force $F_f$ by the force $F_1$ and the angle θ. Referring to FIG. 3B, reference numeral $F_i$ represents a force generated in the hook portion 50a of the lock arm 50 based on the impact force.

Since no impact force acts on the apparatus in the condition shown in FIG. 3A, only the force $F_2$ acting in the direction (Z' direction) along the inclined surface 40a of the lock pin 40 acts on the hook portion 50a of the lock arm 50. Accordingly, no displacement occurs in the hook portion 50a in the direction along the inclined surface 40a of the lock pin 40.

In the condition shown in FIG. 3B, on the other hand, in which the impact force acts on the apparatus. As a result, a force $F_i$, in addition to the force $F_2$, acts on the hook portion 50a of the lock arm 50 in the direction (Z' direction) along the inclined surface 40a of the lock pin 40. A force $F_2+F_i$ representing the sum of the force $F_2$ and the force $F_i$ becomes greater than the force $F_f$. Accordingly, displacement occurs in the hook portion 50a in the direction (Z' direction) along the inclined surface 40a of the lock pin 40. In the optical disc apparatus according to the first embodiment of the present invention, if the impact force is less than 200 G, $2\times10^{-3}$ s, the displacement of the hook portion 50a in the direction (Z' direction) along the inclined surface 40a of the lock pin 40 caused by the force $F_2+F_i$ is a value that falls within the range, over which the hook portion 50a remains in the inclined surface 40a. If the impact force is equal to, or more than, 200 G, $2\times10^{-3}$ s, the displacement of the hook portion 50a in the direction (Z' direction) along the inclined surface 40a of the lock pin 40 caused by the force $F_2+F_i$ is a large one that falls outside the range, over which the hook portion 50a remains in the inclined surface 40a. The displacement of the hook portion 50a is produced from a displacement of the arm portion 50b of the lock arm 50 (FIG. 2), the support portion 50d of the lock arm 50 (FIG. 2), and the like.

FIGS. 4A and 4B are views for illustrating displacement of the lock arm 50 produced by the force generated at the hook portion 50a. FIG. 4A shows a condition, in which the impact force does not act on the apparatus. FIG. 4B shows a condition, in which the impact force acts on the apparatus. When the impact force does not act on the apparatus, the hook portion 50a of the lock arm 50 is not displaced in the direction (Z' direction) along the inclined surface 40a of the lock pin 40. The arm portion 50b of the lock arm 50 thus extends substantially in parallel with the plane of the tray 10 (FIG. 4A). When the impact force acts on the apparatus, on the other hand, the arm portion 50b of the lock arm 50, the support portion 50d of the lock arm 50, and the like are displaced by the force $F_2+F_i$ representing the sum of the force $F_2$ based on the resilient restoring force of the tension coil spring 101 and the force $F_i$ based on the impact force. As a result, the hook portion 50a of the lock arm 50 is displaced in the direction (Z' direction) along the inclined surface 40a of the lock pin 40. If the impact force is equal to, or more than, 200 G, $2\times10^{-3}$ s, the displacement causes the hook portion 50a to be unhooked from the inclined surface 40a and a holding state (locked state) of the tray 10 is released (FIG. 4B). At this time, the amount of displacement of the arm portion 50b of the lock arm 50 is determined by stiffness of the arm portion 50b and the force $F_2+F_i$ representing the sum of the force $F_2$ and the force $F_i$. The amount of displacement of the support portion 50d of the lock arm 50 is determined by stiffness of the support portion 50d itself and stiffness of the material of the tray to which the support portion 50d is fixed. The stiffness of the arm portion 50b is defined by the material, shape and dimensions of the cross section, and the length of the arm portion 50b. In accordance with the first embodiment of the present invention, the stiffness of the arm portion 50b, the support portion 50d itself, and the tray material is set such that the displacement is produced to the extent that the hook portion 50a is not unhooked from the inclined surface 40a when the impact force is less than 200 G, $2\times10^{-3}$ s, and the displacement is produced to the extent that the hook portion 50a is unhooked from the inclined surface 40a when the impact force is equal to, or more than, 200 G, $2\times10^{-3}$ s. The following should herein be noted. Specifically, assume a condition, in which the impact force causes the bottom case 32 to vibrate and then to be displaced in a direction perpendicular to a plane thereof. At a timing, at which the direction of the above-referenced displacement is opposite to the direction of the displacement of the hook portion 50a, the hook portion 50a is more easily unhooked from the inclined surface 40a of the lock pin 40. At another timing, at which the direction of the above-referenced displacement is the same as the direction of the displacement of the hook portion 50a, the hook portion 50a is less easily unhooked from the inclined surface 40a of the lock pin 40. These aspects should be taken into consideration when designing the lock pin 40, the lock arm 50, the bottom case 32, and the like.

In accordance with the first embodiment of the present invention described heretofore, the optical disc apparatus having the simplified structure allows the engagement between the lock arm 50 and the lock pin 40 to be automatically maintained or released relative to the impact force. This allows the tray 10 to be held in position or released in response to a specific value of the impact force, thereby preventing parts from being damaged and enhancing reliability of the apparatus.

Figure 5:
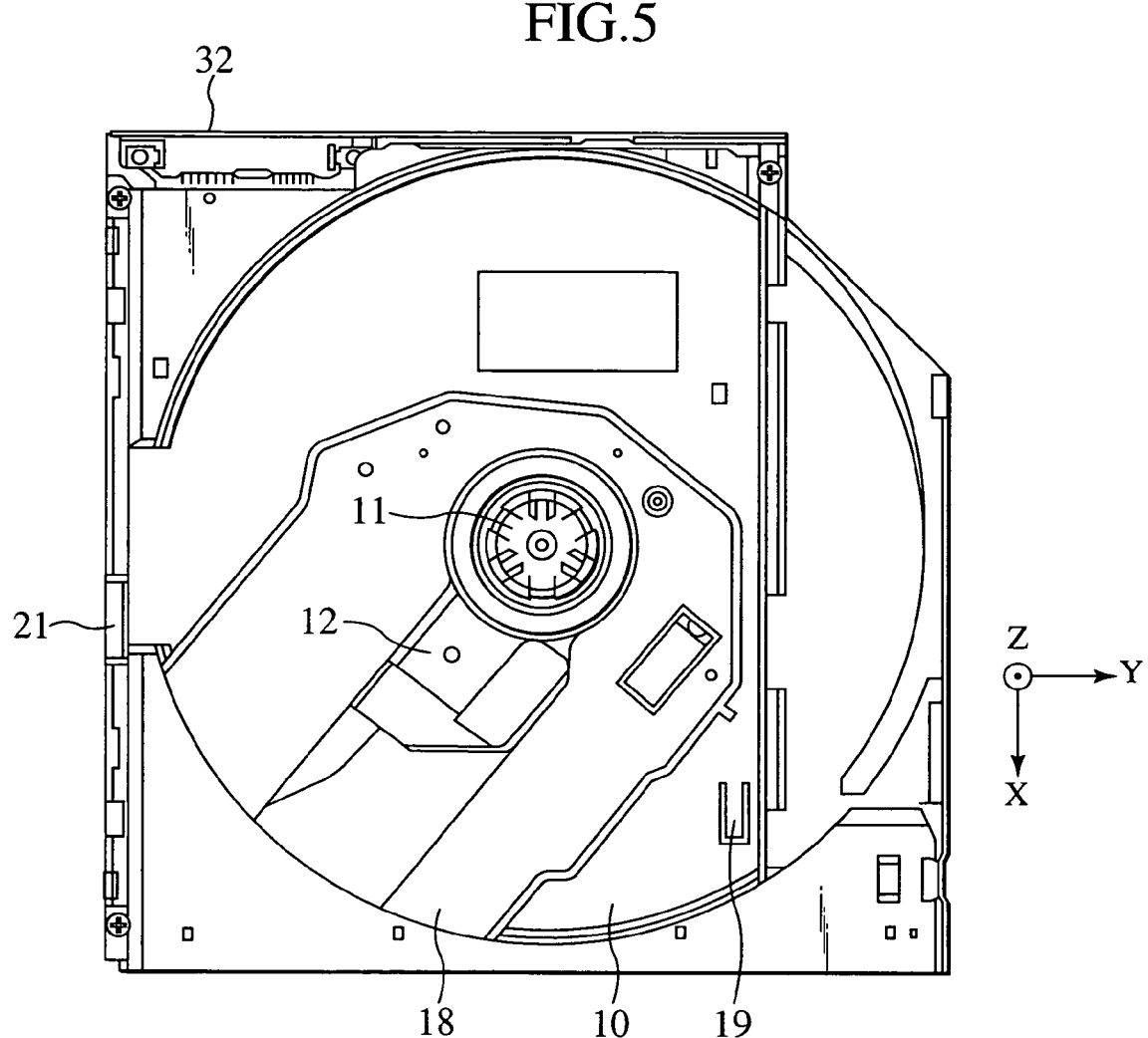
FIG. 5 is a view showing a typical construction of an optical disc apparatus according to a second embodiment of the present invention.

FIG. 5 is a view showing a typical construction of an optical disc apparatus according to a second embodiment of the present invention. In the second embodiment of the present invention, a tray 10 includes a pressure portion disposed thereon. The pressure portion urges a lock arm 50 in an axial direction of a lock pin 40.

Referring to FIG. 5, reference numeral 18 represents a cover member covering a mechanical portion of the apparatus. Reference numeral 19 represents a pressure portion that urges the lock arm 50 disposed on the side of a back surface of the tray 10 in an axial direction of the lock pin 40. The pressure portion 19 may be formed, for example, by forming a slot in part of the tray 10. In the second embodiment of the present invention, stiffness of the pressure portion 19 acts so as to suppress an increase in the amount of displacement of a hook portion 50a of the lock arm 50 in a direction (Z' direction) along an inclined surface 40a of the lock pin 40. Instead of being integrated with the tray 10, the pressure portion 19 may be a separate element mounted on the tray 10.

In accordance with the second embodiment of the present invention, too, the optical disc apparatus having the simplified structure allows the engagement with an apparatus main body portion of the tray 10 to be maintained or released relative to the impact force. This prevents parts from being damaged and enhances reliability of the apparatus.

The present invention may be embodied in forms other than the above-referenced preferred embodiments without departing from the spirit of essential characteristics thereof. The above embodiments of the present invention are therefore illustrative only and not restrictive. The scope of the present invention is defined by the appended claims. Further, all changes that fall within metes and bounds of the claims, or equivalents of such metes and bounds are therefore intended to be embraced by the claims.

Description of reference numerals used in the drawings of the specification is as follows:

10: Tray
11: Turntable
12: Optical pickup
18: Cover member
19: Pressure portion
21: Rail member
22: Guide rail member
32: Bottom case
40: Lock pin
40a: Inclined surface
50: Lock arm
50a: Hook portion
50b: Arm portion
50c, 60c, 70c: Rotational pivot
50d: Support portion
60: First rotational member
70: Second rotational member
80: Solenoid member
101, 102: Tension coil spring
103: Torsion coil spring

What is claimed is:

1. An optical disc apparatus having a structure for holding a tray, which loads and unloads an optical disc, at a predetermined position within a case, the optical disc apparatus comprising:
    a lock pin disposed in a protruded condition on a side of an inner surface of the case and tapered in a protruding direction thereof;
    a lock arm disposed on the tray, the lock arm including:
        a hook portion to be engaged with an inclined surface of the lock pin;
        an arm portion formed to continue into the hook portion; and
        a support portion supporting the arm portion rotatably about a pivot, the lock arm being engaged with the lock pin in a condition, in which the tray has moved to the predetermined position within the case, thereby holding the tray in the predetermined position; and
    a resilient member connected to the lock arm, the resilient member restricting, by a resilient restoring force thereof, an abutment force of the hook portion of the lock arm against the inclined surface of the lock pin, wherein the hook portion of the lock arm is displaced in the protruding direction of the lock pin along the inclined surface of the lock pin when an impact force is applied to the optical disc apparatus.

2. The optical disc apparatus according to claim 1, wherein the hook portion is displaced in the protruding direction of the lock pin along the inclined surface of the lock pin, to be thereby disengaged from the inclined surface when an impact force equal to, or more than, a predetermined value is applied to the optical disc apparatus.

3. The optical disc apparatus according to claim 1, wherein the engagement between the lock arm and the inclined surface of the lock pin is maintained when an operating condition of the impact force is less than about 200 G for about $2 \times 10^{-3}$ s, and released when the operating condition of the impact force is equal to, or more than, about 200 G for about $2 \times 10^{-3}$ s.

4. The optical disc apparatus according to claim 1, wherein the lock arm is arranged such that the hook portion is displaced in the protruding direction of the lock pin by either the arm portion or the support portion, or both, being displaced when an impact force is applied.

5. The optical disc apparatus according to claim 2, wherein the lock arm is arranged such that the hook portion is displaced in the protruding direction of the lock pin by either the arm portion or the support portion, or both, being displaced when an impact force is applied.

6. The optical disc apparatus according to claim 3, wherein the lock arm is arranged such that the hook portion is displaced in the protruding direction of the lock pin by either the arm portion or the support portion, or both, being displaced when an impact force is applied.

* * * * *